US010107643B2

(12) United States Patent
Marshall

(10) Patent No.: US 10,107,643 B2
(45) Date of Patent: *Oct. 23, 2018

(54) MESSAGE FILTERING BASED ON DESTINATION, PLAN, INTENT, EXPECTATION, OR ROUTE

(71) Applicant: The MITRE Corporation, McLean, VA (US)

(72) Inventor: James W. Marshall, Purcellville, VA (US)

(73) Assignee: The MITRE Corporation, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/047,549

(22) Filed: Oct. 7, 2013

(65) Prior Publication Data

US 2015/0100239 A1   Apr. 9, 2015

(51) Int. Cl.
*G01C 21/36* (2006.01)
*G06Q 30/02* (2012.01)
(Continued)

(52) U.S. Cl.
CPC ..... *G01C 21/3682* (2013.01); *G01C 21/3691* (2013.01); *G01C 21/3697* (2013.01);
(Continued)

(58) Field of Classification Search
None
See application file for complete search history.

(56) References Cited

U.S. PATENT DOCUMENTS 4,860,352 A    8/1989  Laurance et al.
5,243,652 A    9/1993  Teare et al.
(Continued)

FOREIGN PATENT DOCUMENTS

EP    1 320 270 A1    6/2003
EP    1 427 226 A1    6/2004

OTHER PUBLICATIONS

Menouar, H. et al., "Relative driving direction detection for safety and non safety applications in vehicular communication networks," *9th International Conference on Intelligent Transport Systems Telecommunications*, 2009, pp. 262-266.
(Continued)

*Primary Examiner* — Mussa A Shaawat
*Assistant Examiner* — Abdhesh K Jha
(74) *Attorney, Agent, or Firm* — Sterne, Kessler, Goldstein & Fox, PLLC

(57) ABSTRACT

Systems and methods for disseminating messages to a user via a mobile computing device are provided. In an embodiment, a route of the mobile computing device that includes at least a destination and one or more segments is determined, and one or more generally-broadcast messages, each corresponding to a geographic region, are received. A determination is made as to whether the mobile computing device, while traveling along the route to the destination, will traverse a particular geographic region associated with a particular generally-broadcast message of the one or more generally-broadcast messages; and if/when the mobile computing device will traverse the particular geographic region, the particular generally-broadcast message is disseminated, through the mobile computing device, to the user.

22 Claims, 5 Drawing Sheets

(51) Int. Cl.
*H04W 4/021* (2018.01)
*H04W 4/06* (2009.01)

(52) U.S. Cl.
CPC ........ *G06Q 30/0261* (2013.01); *H04W 4/021* (2013.01); *H04W 4/06* (2013.01)

(56) References Cited

U.S. PATENT DOCUMENTS

| | | |
|---|---|---|
| 5,293,163 A | 3/1994 | Kakihara et al. |
| 5,636,245 A | 6/1997 | Ernst et al. |
| 6,216,085 B1 | 4/2001 | Emmcrink et al. |
| 6,346,890 B1 | 2/2002 | Bellin |
| 6,522,250 B1 | 2/2003 | Ernst et al. |
| 6,552,250 B1 | 2/2003 | Ernst et al. |
| 6,683,526 B2 | 1/2004 | Bellin |
| 8,180,366 B2 | 5/2012 | Ernst et al. |
| 8,368,530 B1 | 2/2013 | Zhang et al. |
| 8,792,907 B2 | 7/2014 | Ernst et al. |
| 8,984,147 B1* | 3/2015 | Kret ................... G06Q 30/0266 701/400 |
| 2002/0049064 A1 | 4/2002 | Banno |
| 2002/0105444 A1 | 8/2002 | Flick |
| 2002/0107027 A1 | 8/2002 | O'Neil |
| 2002/0155844 A1 | 10/2002 | Rankin et al. |
| 2004/0246147 A1 | 12/2004 | von Grabe |
| 2005/0075116 A1 | 4/2005 | Laird et al. |
| 2005/0170848 A1 | 8/2005 | Sato et al. |
| 2007/0015495 A1 | 1/2007 | Winter et al. |
| 2009/0286553 A1* | 11/2009 | Northway et al. ......... 455/456.3 |
| 2012/0105651 A1* | 5/2012 | Lahcanski ............. G01C 21/20 348/207.1 |
| 2013/0115872 A1* | 5/2013 | Huang ................... H04W 4/02 455/3.01 |
| 2013/0197922 A1* | 8/2013 | Vesto ................ 705/2 |
| 2014/0046677 A1* | 2/2014 | Bar-Or ............... 705/2 |
| 2015/0095157 A1* | 4/2015 | McDevitt ........... G06Q 30/0261 705/14.58 |

OTHER PUBLICATIONS

International Search Report and Written Opinion for Appl. No. PCT/US2008/007865, dated Sep. 3, 2008, 10 pages.

* cited by examiner

MESSAGE FILTERING BASED ON DESTINATION, PLAN, INTENT, EXPECTATION, OR ROUTE

FIELD OF THE INVENTION

The present invention relates generally to message filtering.

BACKGROUND

Today, location-based services are widely available. However, conventional location-based services rely on filtering of information at the infrastructure end, i.e., at the source of the broadcast data. As such, privacy issues related to the knowledge of a user's location typically arise.

BRIEF DESCRIPTION OF THE DRAWINGS/FIGURES

Figure 1:
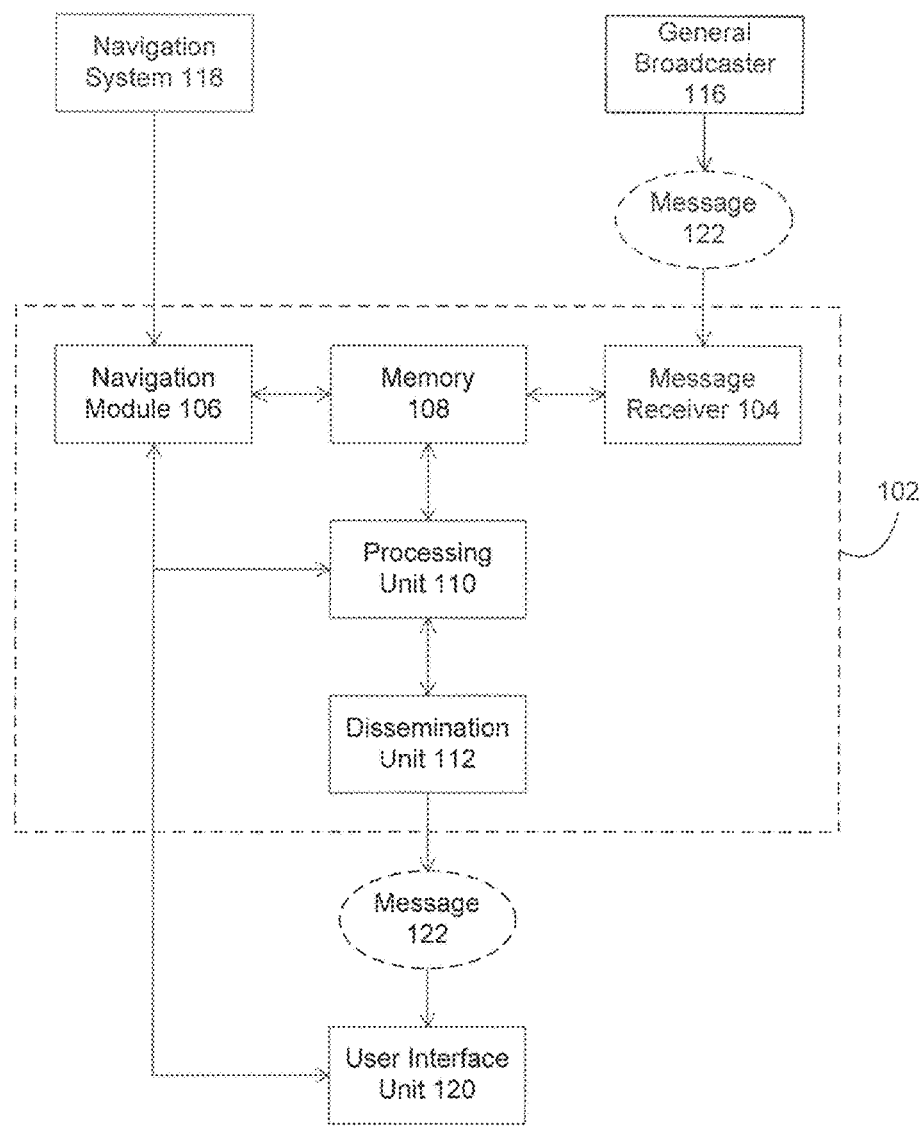
FIG. 1 illustrates an example system according to an embodiment.

The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF EMBODIMENTS

FIG. 1 illustrates an example system 100 according to an embodiment. Example system 100 is provided for the purpose of illustration only and is not limiting of embodiments. As shown in FIG. 1, example system 100 includes a mobile computing device 102, a navigation system 118, a general broadcaster 116, and a user interface unit 120. In an embodiment, user interface unit 120 can be integrated within mobile computing device 102.

Mobile computing device 102 includes a message receiver 104, a navigation module 106, a memory 108, a processing unit 110, and a dissemination unit 112. Mobile computing device 102 can be a handheld device, such as a cellular phone, tablet, laptop, or other dedicated mobile device (e.g., tactical mobile device). Mobile computing device 102 can be integrated into a mobile system, such as a car, bus, train, or airplane, for example.

In an embodiment, message receiver 104 is configured to communicate with general broadcaster 116 to receive messages, such as message 122, from general broadcaster 116 and to store the messages in memory 108. In another embodiment, message receiver 104 can receive message 122 from a plurality of general broadcasters 116, each of which transmitting message 122 simultaneously or at a different times.

Communication between message receiver 104 and general broadcaster 116 can be through any known wireless means. For example, in an embodiment, general broadcaster 116 includes an FM (Frequency Modulation) transmitter, and message receiver 104 includes an FM receiver configured to receive FM broadcast messages from general broadcaster 116. In another embodiment, general broadcaster 116 can be part of a cellular network infrastructure (e.g., a base station) and can use cellular-based communications to transmit messages to message receiver 104. Message receiver 104, accordingly, can include a cellular-based receiver configured to receive cellular broadcast messages from general broadcaster 116. For example, the messages can be broadcast on a dedicated channel of the cellular network. General broadcaster 116 may also employ other wireless multi-access network technologies, such as Wireless Local Area Network (WLAN), for example.

In an embodiment, messages transmitted by general broadcaster 116, such as message 122, include generally-broadcast messages that are not necessarily intended for a particular computing device. In another embodiment, messages transmitted by general broadcaster 116 can be transmitted to a select subset of computing devices from a total number of user computing devices. Each generally-broadcast message corresponds to one or more geographic regions and can include a message (e.g., alert, warning, advertisement, etc.) of interest for the one or more geographic regions. In an embodiment, the generally-broadcast message includes a definition of the geographic region(s) to which it relates. For example, the geographic region can be defined by a point, or a radius from a central point, which may or may not fall along a route of mobile computing device 102. Alternatively, the geographic region can be a 2-dimensional region defined by a set of coordinates, each coordinate including at least a latitude and a longitude that indicates a vertex of the 2-dimensional geographic region. Alternatively or additionally, the geographic region can be a 3-dimensional region defined by a set of coordinates, each particular coordinate including latitude, longitude, and altitude that indicates a vertex of the 3-dimensional geographic region. Different known coordinate systems may also be used to represent the set of coordinates defining the geographic region, including, for example, the Universal Transverse Mercator (UTM) coordinate system, the Universal Polar Stereographic (UPS) coordinate system, and military grid systems. In another embodiment, the generally-broadcast message includes a start date and time and an end date and time that define a period of validity of the generally-broadcast message for the geographic region.

Navigation module 106 is configured to communicate with navigation system 118 to receive navigation signals. Navigation system 118 can include a Global Navigation Satellite System (GNSS), such as Global Positioning System (GPS), GLONASS, Galileo, or Beidou. In an embodiment, navigation module 106 includes a navigation receiver configured to process the navigation signals from navigation system 118 and to compute a current position of mobile computing device 102.

Additionally, navigation module 106 includes a route determination module that can be used to determine a route for mobile computing device 102. In an embodiment, navigation module 106 is configured to communicate with user interface unit 120 to receive user input specifying a desired destination. Using the desired destination and the current position of mobile computing device 102, navigation module 106 determines a route from the current position of mobile computing device 102 to the desired destination by accessing geospatial information stored in memory 108. In another embodiment, navigation module 106 relies on processing unit 110 for determining the route. Navigation module 106 then sends the determined route to user interface unit 120, where it can be displayed to the user.

Figure 4:
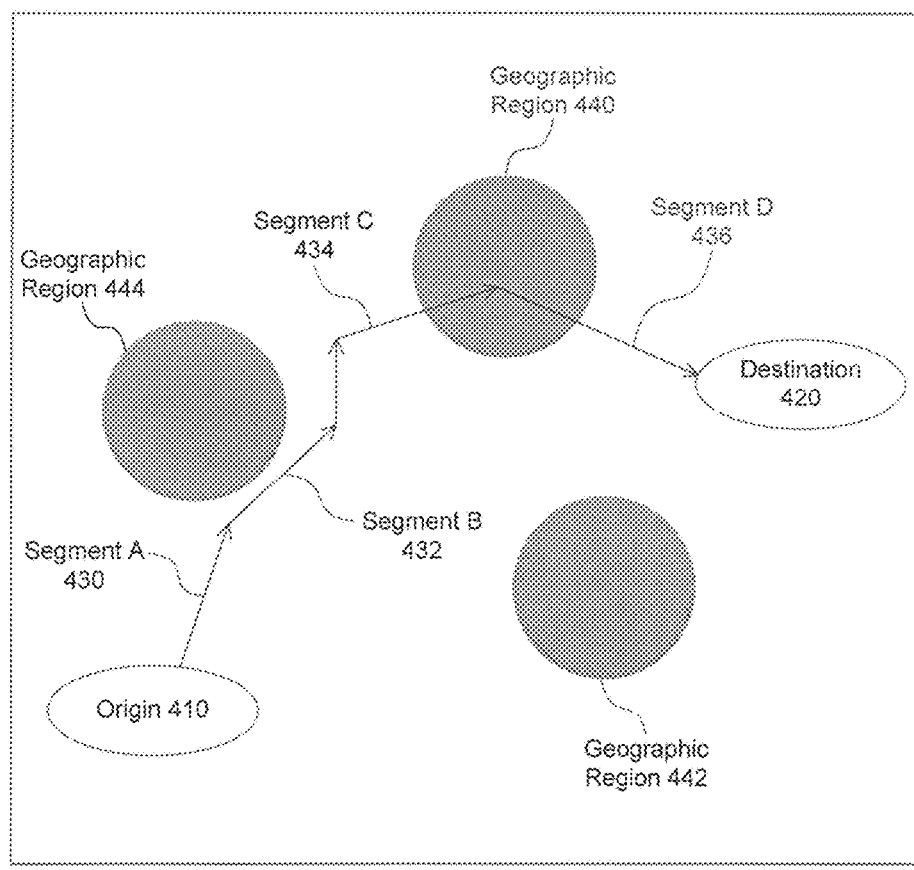
FIG. 4 illustrates an example route according to an embodiment.

FIG. 4 illustrates an example route 400 that can be determined using navigation module 106, for example. As shown in FIG. 4, example route 400 includes an origin 410, a destination 420, and a plurality of segments 430, 432, 434, and 436. Example route 400 can pass near or intersect various geographic regions, such as geographic regions 440, 442, and 444. Generally-broadcast messages corresponding to one or more of regions 440, 442, and 444 may be available from general broadcaster 116.

In an embodiment, processing unit 110 is configured to determine whether mobile computing device 102, while traveling along the planned route to the desired destination, will traverse a particular geographic region associated with a particular generally-broadcast message previously received from general broadcaster 116. In an embodiment, processing unit 110 periodically retrieves the projected route of mobile computing device 102 from navigation module 106 and compares the projected route of mobile computing device 102 against the geographic regions associated with the generally-broadcast messages stored in memory 108. For example, generally-broadcast messages corresponding to geographic regions 440, 442, and 444 shown in FIG. 4 may have been previously received from general broadcaster 116 and stored in memory 108. Processing unit 110, accordingly, periodically compares the projected route of mobile computing device 102 against geographic regions 440, 442, and 444 to determine whether mobile computing device 102 will intersect any one of these geographic regions.

In an embodiment, processing unit 110 is configured to forward the particular generally-broadcast message to dissemination unit 112 when mobile computing device 102 will traverse/intersect the particular geographic region associated with the particular generally-broadcast message. Dissemination unit 112 is configured to disseminate the particular generally-broadcast message to the user via user interface unit 120 or to take some other action at the receiver location as indicated in the message.

In an embodiment, to compare the projected route of mobile computing device 102 against a particular geographic region associated with a particular generally-broadcast message, processing unit 110 is configured to determine a distance along the route between mobile computing device 102 and a closest border of the particular geographic region that intersects the route; determine a velocity at which mobile computing device 102 will travel along the distance; calculate a date and time of when mobile computing device 102 will enter the particular geographic region based on the velocity and the distance; and determine whether the date and time of when mobile computing device 102 will enter into the particular geographic region falls within the start date and time and the end date and time of the particular generally-broadcast message. For example, referring to FIG. 4, assuming that mobile computing device 102 is traveling along segment 434 towards geographic region 440, processing unit 110 determines a remaining distance along segment 434 until mobile computing device 102 enters geographic region 440; and then using this determined distance determines the date and time of when mobile computing device 102 is expected to enter geographic region 440 based on a velocity of mobile computing device 102. The velocity can be calculated based on a predetermined past time window, and can be an average velocity for the predetermined past time window. Alternatively, the velocity can be a predicted or estimated velocity, determined based on known vehicle speed limits along the projected route, time of day, and/or traffic conditions In an embodiment, if mobile computing device 102 will traverse the particular geographic region during the start date and time and the end date and time of the particular generally-broadcast message, processing unit 110 forwards the particular generally-broadcast message to dissemination unit 112, which disseminates the particular generally-broadcast message to the user via user interface unit 120. Otherwise, processing unit 110 does not forward the particular generally-broadcast message to dissemination unit 112. For example, referring to FIG. 4, if mobile computing device 102 is anticipated to traverse geographic region 440 before or after the time period defined by the start date and time and the end date and time of the particular generally-broadcast message, then processing unit 110 does not forward the particular generally-broadcast message to dissemination unit 112.

In another embodiment, processing unit 110 is further configured to determine when mobile computing device 102 will first intersect the particular geographic region and to forward the particular generally-broadcast message to dissemination unit 112 so that dissemination unit 112 can disseminate the particular generally-broadcast message to the user before mobile computing device 102 intersects the particular geographic region. In an embodiment, the amount of time between dissemination to the user and mobile computing device 102 intersecting the particular geographic region can be configurable depending on the nature and/or a priority of the particular generally-broadcast message.

In a further embodiment, processing unit 110 is further configured to determine when mobile computing device 102 will exit the particular geographic area and to forward the particular generally-broadcast message to dissemination unit 112 only when mobile computing device 102 will be within the particular geographic region for at least a predetermined duration. As such, dissemination unit 112 disseminates a generally-broadcast message to the user only when mobile computing device 102 will be in the geographic region associated with the generally-broadcast message for at least the predetermined duration.

In a further embodiment, processing unit 110 is further configured to determine whether mobile computing device 102 will pass within a predetermined distance of the particular geographic region, and if so, to forward the particular generally-broadcast message along with a notification of a distance between mobile computing device 102 and the particular geographic region. Dissemination unit 112 can then disseminate the particular generally-broadcast message along with the distance notification to the user. For example, referring to FIG. 4, assuming that mobile computing device 102 is traveling along segment 432 of example route 400 and that it will pass within the predetermined distance of geographic region 444, then processing unit 110 forwards the generally-broadcast message corresponding to geographic region 444 along with a notification of the distance between mobile computing device 102 and geographic region 444 to dissemination unit 112. In an embodiment, the predetermined distance can be configurable depending on the nature and/or a priority of the generally-broadcast message. For example, the predetermined distance can be shorter for certain message types and/or for higher priority messages.

In another embodiment, processing unit 110 is configured to forward the particular generally-broadcast message to dissemination unit 112 when a distance of a side-track from the original projected route to the particular geographic region is within a predetermined distance. In a further embodiment, processing unit 110 is configured to forward the particular generally-broadcast message to dissemination unit 112 when a travel time of a side-track from the original projected route to the particular geographic region is within a predetermined time (e.g., does not add more than 10 minutes to projected travel time) or when the total travel time including the side-track does not exceed a predetermined time (e.g., does not exceed 1 hour) or violate a set arrival time at the original destination. In an embodiment, these predetermined times can be configured by the user and can vary depending on message priority, time of day, day of the week, to name a few examples.

In an embodiment, in addition to forwarding the generally-broadcast message to dissemination unit 112 (when the side-track distance/travel time meets the predetermined distance/time), processing unit 110 is further configured to instruct navigation module 106 to determine an alternate route for mobile computing device 102 that travels towards the particular geographic region or point defined by the geographic region.

In a further embodiment, when mobile computing device 102 is bound to traverse the particular geographic region, processing unit 110 is further configured to instruct navigation module 106 to determine an alternate route for mobile computing device 102 that does not traverse the particular geographic region. If such alternate route can be determined by navigation module 106, processing unit 110 is configured to forward the alternate route to dissemination unit 112, which displays the alternate route to the user via user interface unit 120.

Figure 2:
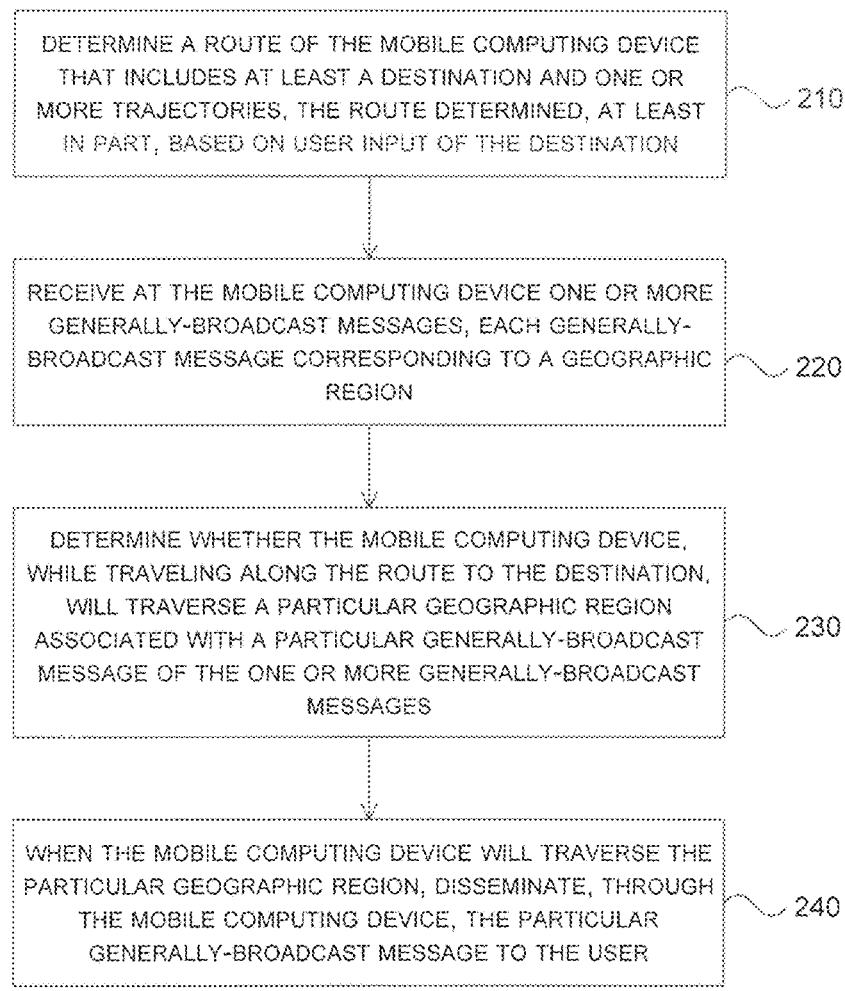
FIG. 2 is an example process for disseminating messages to a user according to an embodiment.

FIG. 2 is an example process 200 for disseminating messages to a user according to an embodiment. Example process 200 is provided for the purpose of illustration only and is not limiting of embodiments. Example process 200 can be performed by a mobile computing device, such as mobile computing device 102 of FIG. 1, for example.

As shown in FIG. 2, process 200 begins in step 210, which includes determining a route of the mobile computing device that includes at least a destination and one or more segments, the route determined, at least in part, based on user input of the destination. In an embodiment, step 210 can be performed by a navigation module, such as navigation module 106 of FIG. 1.

Subsequently, process 200 proceeds to step 220, which includes receiving at the mobile computing device one or more generally-broadcast messages, each of the generally-broadcast messages corresponding to a geographic region. In an embodiment, step 220 can be performed by a message receiver, such as message receiver 104 of FIG. 1, to receive one or more generally-broadcast messages from general broadcaster 116. In an embodiment, a generally-broadcast message includes a definition of the geographic region to which it relates. For example, the geographic region can be defined by a radius from a central point, which may or may not fall along a route of the mobile computing device. Alternatively, the geographic region can be defined by a set of coordinates, each coordinate including at least a latitude and a longitude that indicates a vertex of the geographic region. Alternatively or additionally, the geographic region can be defined by a set of coordinates that describe a three-dimensional geographic region, each particular coordinate including latitude, longitude, and altitude that indicates a vertex of the three-dimensional geographic region. In another embodiment, the generally-broadcast message includes a start date and time and an end date and time that define a period of validity of the generally-broadcast message for the geographic region.

Then, in step 230, process 200 includes determining whether the mobile computing device, while traveling along the route to the destination, will traverse a particular geographic region associated with a particular generally-broadcast message of the one or more generally-broadcast messages. In an embodiment, step 230 can be performed by a processing unit, such as processing unit 110 of FIG. 1.

In an embodiment, step 230 further includes determining a distance along the route between the mobile computing device and a closest border of the particular geographic region that intersects the route; determining a velocity at which the mobile computing device will travel along the distance; calculating a date and time of when the mobile computing device will enter the particular geographic region based on the velocity and the distance; and determining whether the date and time of when the mobile computing device will enter into the particular geographic region falls within the start date and time and the end date and time identified in the particular generally-broadcast message.

In another embodiment, step 230 further includes determining when the mobile computing device will first intersect the particular geographic region. In a further embodiment, step 230 further includes determining when the mobile computing device will exit the particular geographic area. In an further embodiment, step 230 further includes determining whether the mobile computing device will pass within a predetermined distance of the particular geographic region.

In another embodiment, when the mobile computing device will traverse the particular geographic region, step 230 further includes determining an alternate route to the destination that does not traverse the particular geographic region; and notifying the user through the mobile computing device that the alternate route is available.

Finally, process 200 terminates in step 240, which includes, disseminating, through the mobile computing device, the particular generally-broadcast message to the user, when the mobile computing device will traverse the particular geographic region.

In an embodiment, step 240 further includes disseminating the particular generally-broadcast message to the user before the mobile computing device intersects the particular geographic region. In a further embodiment, step 240 further includes disseminating the particular generally-broadcast message only when the mobile computing device will traverse the particular geographic region during the start date and time and the end date and time of the particular generally-broadcast message. In a further embodiment, step 240 further includes disseminating the particular generally-broadcast message when the mobile computing device will be within the particular geographic region for at least a predetermined duration. In a further embodiment, step 204 further includes disseminating the particular generally-broadcast message along with a notification of a distance between the mobile computing device and the particular geographic region.

Figure 3:
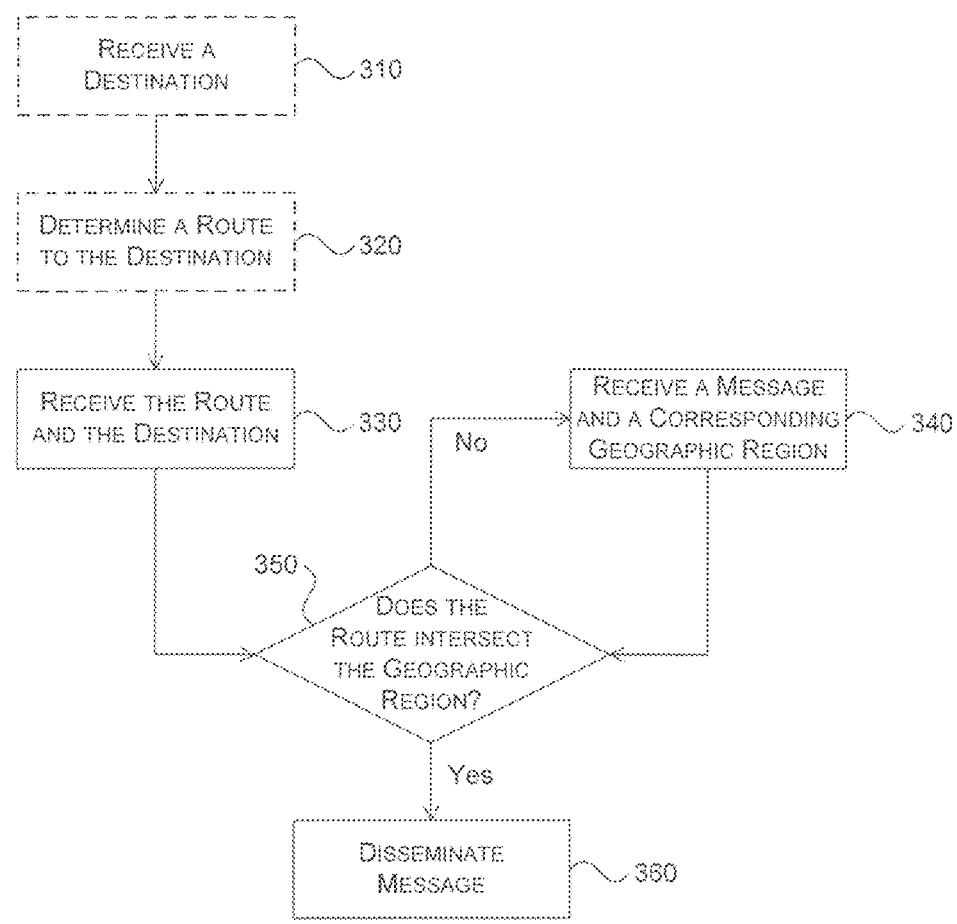
FIG. 3 is another example process for disseminating messages to a user according to an embodiment.

FIG. 3 is another example process 300 for disseminating messages to a user according to an embodiment. Example process 300 is provided for the purpose of illustration only and is not limiting of embodiments. Example process 300 can be performed by a mobile computing device, such as mobile computing device 102 of FIG. 1, for example. As shown in FIG. 3, process 300 includes steps 310, 320, 330, 340, 350, and 360. Steps 310 and 320 can be optional.

Process 300 can begin in step 310, which includes receiving a destination. In an embodiment, step 310 can be performed by a user interface unit, such as user interface unit 120 of FIG. 1, that can receive user input including a destination from a user.

Subsequently, process 300 proceeds to step 320, which includes determining a route to the destination. In an embodiment, step 320 can be performed by a navigation module, such as navigation module 106 of FIG. 1, that can determine a route between a current position of the mobile computing device and the destination.

Then, in step 330, process 300 includes receiving the route and the destination, and in step 340, process 300 includes receiving a message and a corresponding geographic region. Steps 330 and 340 can be performed by a processing unit, such as processing unit 110 of FIG. 1, that can receive the route and the destination from navigation module 106 and a generally-broadcast message from memory 108. Steps 330 and 340 can be performed in any order according to embodiments.

Subsequently, process 300 proceeds to step 350, which includes determining whether the route intersects the geographic region. In an embodiment, step 350 includes performing step 230 of example process 200 described above. If the route intersects the geographic region, process 300 proceeds to step 360, which includes disseminating the message. In an embodiment, step 360 can be performed by a disseminating unit, such as disseminating unit 112 of FIG. 1, that can disseminate messages received from the processing unit to the user via a user interface unit. Otherwise, if the route does not intersect the geographic region, process 300 returns to step 340, to receive another message and corresponding geographic region.

Figure 5:
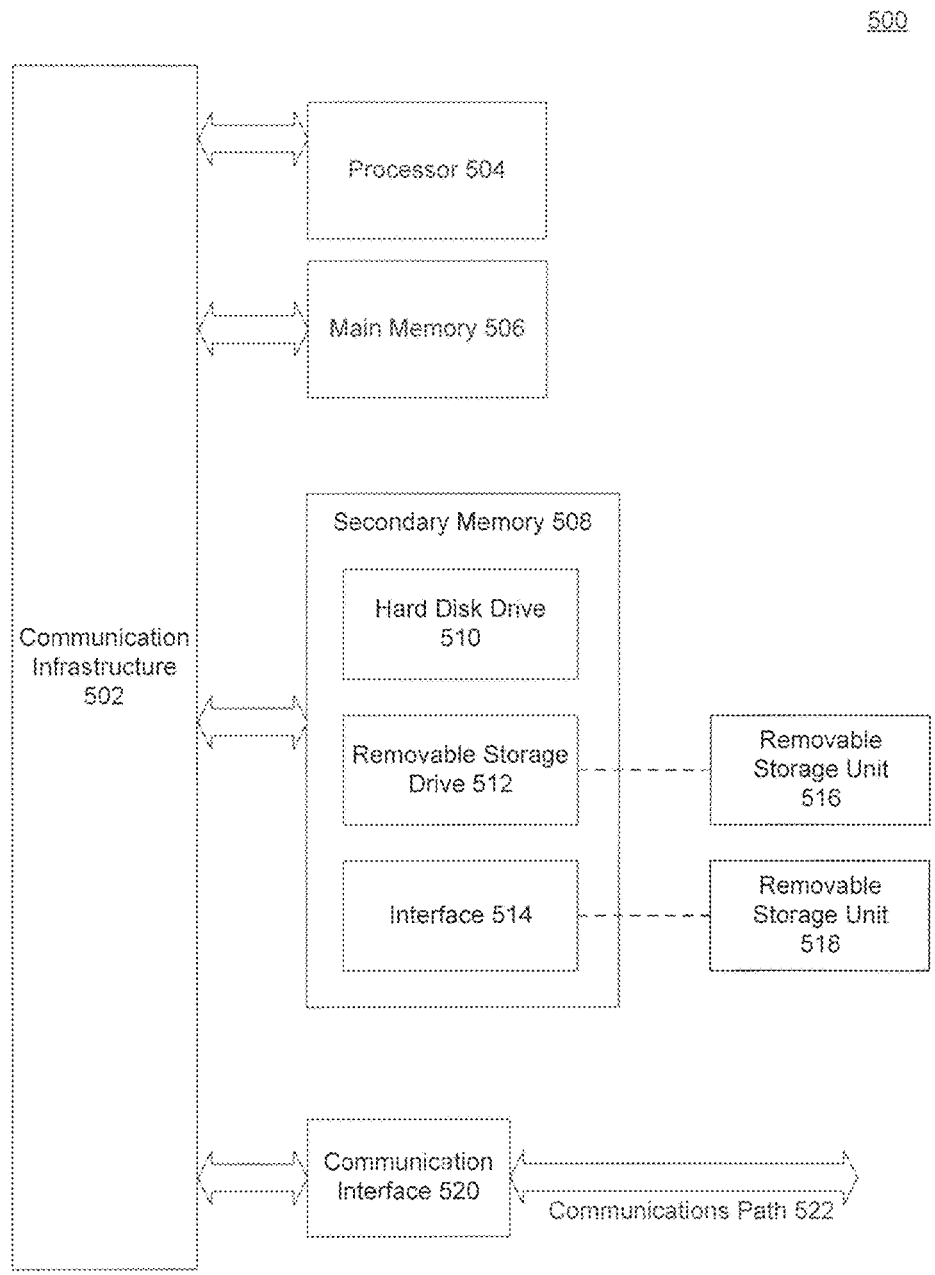
FIG. 5 illustrates an example computer system that can be used to implement aspects of embodiments.

Embodiments of the present disclosure can be implemented in hardware, software or as a combination of software and hardware. Consequently, embodiments of the disclosure may be implemented in the environment of a computer system or other processing system. An example computer system 500, which can be used to implement embodiments, is shown in FIG. 5. Embodiments described in FIGS. 1-3 above may execute or can be implemented on one or more computer systems 500.

As shown in FIG. 5, computer system 500 includes one or more processors, such as processor 504. Processor 504 can be a special purpose or a general purpose digital signal processor. Processor 504 is connected to a communication infrastructure 502 (for example, a bus or network). Various software implementations are described in terms of this exemplary computer system. After reading this description, it will become apparent to a person skilled in the relevant art(s) how to implement the disclosure using other computer systems and/or computer architectures.

Computer system 500 also includes a main memory 506, preferably random access memory (RAM), and may also include a secondary memory 508. Secondary memory 508 may include, for example, a hard disk drive 510 and/or a removable storage drive 512, representing a floppy disk drive, a magnetic tape drive, an optical disk drive, or the like. Removable storage drive 512 reads from and/or writes to a removable storage unit 516 in a well-known manner. Removable storage unit 516 represents a floppy disk, magnetic tape, optical disk, or the like, which is read by and written to by removable storage drive 512. As will be appreciated by persons skilled in the relevant art(s), removable storage unit 516 includes a computer usable storage medium having stored therein computer software and/or data.

In alternative implementations, secondary memory 508 may include other similar means for allowing computer programs or other instructions to be loaded into computer system 500. Such means may include, for example, a removable storage unit 518 and an interface 514. Examples of such means may include a program cartridge and cartridge interface (such as that found in video game devices), a removable memory chip (such as an EPROM, or PROM) and associated socket, a thumb drive and USB port, and other removable storage units 518 and interfaces 514 which allow software and data to be transferred from removable storage unit 518 to computer system 500.

Computer system 500 may also include a communications interface 520. Communications interface 520 allows software and data to be transferred between computer system 500 and external devices. Examples of communications interface 520 may include a modem, a network interface (such as an Ethernet card), a communications port, a PCMCIA slot and card, etc. Software and data transferred via communications interface 520 are in the form of signals which may be electronic, electromagnetic, optical, or other signals capable of being received by communications interface 520. These signals are provided to communications interface 520 via a communications path 522. Communications path 522 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 516 and 518 or a hard disk installed in hard disk drive 510. These computer program products are means for providing software to computer system 500.

Computer programs (also called computer control logic) are stored in main memory 506 and/or secondary memory 508. Computer programs may also be received via communications interface 520. Such computer programs, when executed, enable the computer system 500 to implement the present disclosure as discussed herein. In particular, the computer programs, when executed, enable processor 504 to implement the processes of the present disclosure, such as any of the methods described herein. Accordingly, such computer programs represent controllers of the computer system 500. Where the disclosure is implemented using software, the software may be stored in a computer program product and loaded into computer system 500 using removable storage drive 512, interface 514, or communications interface 520.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A method of disseminating messages to a user via a mobile computing device, comprising:
    determining an explicitly planned future route for the mobile computing device based on a current location of the mobile computing device and a known destination;
    receiving at the mobile computing device a generally-broadcast message, wherein the generally-broadcast message corresponds to a particular geographic region and a message type, and the generally-broadcast message includes a start date and time and an end date and time that define a period of time in which the generally-broadcast message will be of interest to the user;
    determining a distance along the explicitly planned future route between the mobile computing device and a closest border of the particular geographic region that intersects the explicitly planned future route;
    determining a velocity at which the mobile computing device travels along the distance;
    calculating a date and time of when the mobile computing device traveling along the explicitly planned future route enters the particular geographic region based on the velocity and the distance;
    determining the calculated date and time is within the start date and time and the end date and time of the generally-broadcast message corresponding to the particular geographic region; and
    processing the generally-broadcast message at the mobile computing device only when the calculated date and time is within the start date and time and the end date and time of the generally-broadcast message to reduce computational processing at the mobile computing device.

2. The method of claim 1, wherein the particular geographic region of the generally-broadcast message is defined by a radius from a central point, the central point not falling along the explicitly planned future route.

3. The method of claim 1, wherein the particular geographic region of the generally-broadcast message is defined by a set of coordinates, each coordinate indicating a vertex of the particular geographic region.

4. The method of claim 1, wherein the particular geographic region of the generally-broadcast message is defined by a set of coordinates that describe a three-dimensional geographic region, each coordinate indicating a vertex of the three-dimensional geographic region.

5. The method of claim 1, wherein the disseminating further comprises:
    disseminating a notification of a distance between the mobile computing device and the particular geographic region.

6. The method of claim 5, wherein the disseminating further comprises:
    disseminating the generally-broadcast message when the mobile computing device will traverse the particular geographic region during the start date and time and the end date and time of the generally-broadcast message.

7. The method of claim 6, further comprising:
    determining when the mobile computing device will exit the particular geographic region, and
    wherein the disseminating the generally-broadcast message includes disseminating the generally-broadcast message only when the mobile computing device will be within the particular geographic region for at least a predetermined duration.

8. The method of claim 1, further comprising:
    determining an alternate route to the destination that does not traverse the particular geographic region; and
    notifying the user through the mobile computing device that the alternate route is available.

9. The method of claim 1, further comprising:
    determining when the mobile computing device will first intersect the particular geographic region, and
    wherein the disseminating the generally-broadcast message includes disseminating the generally-broadcast message before the mobile computing device intersects the particular geographic region.

10. A mobile computing device for executing functions that disseminate messages received from a wireless mobile network to a user, comprising:
    a navigation module configured to determine an explicitly planned future route for the mobile computing device based on a current location of the mobile computing device and a known destination;
    a message receiver configured to receive and store in memory a generally-broadcast message, wherein the generally-broadcast message corresponds to a particular geographic region and a message type, and the generally-broadcast message includes a start date and time and an end date and time that define a period of time in which the generally-broadcast message will be of interest to the user;
    a processing unit configured to:
        determine a distance along the explicitly planned future route between the mobile computing device and a closest border of the particular geographic region that intersects the explicitly planned future route;
        determine a velocity at which the mobile computing device travels along the distance;
        calculate a date and time of when the mobile computing device traveling along the explicitly planned future route enters the particular geographic region based on the velocity and the distance; and
        determine the calculated date and time is within the start date and time and the end date and time of the generally-broadcast message corresponding to the particular geographic region; and
    a dissemination unit configured to process the generally-broadcast message only when the calculated date and time is within the start date and time and the end date and time of the generally-broadcast message to reduce computational processing at the mobile computing device.

11. The mobile computing device of claim 10, wherein the particular geographic region of the generally-broadcast message is defined by a radius from a central point, the central point not falling along the planned route.

12. The mobile computing device of claim 10, wherein the particular geographic region of the generally-broadcast message is defined by a set of coordinates, each coordinate indicating a vertex of the particular geographic region.

13. The mobile computing device of claim 10, wherein the particular geographic region of the generally-broadcast message is defined by a set of coordinates that describe a three-dimensional geographic region, each coordinate indicating a vertex of the three-dimensional geographic region.

14. The mobile computing device of claim 10, wherein the dissemination unit is further configured to:
disseminate a notification of a distance between the mobile computing device and the particular geographic region.

15. The mobile computing device of claim 14, wherein the dissemination unit is further configured to:
disseminate the generally-broadcast message when the mobile computing device will traverse the particular geographic region during the start date and time and the end date and time of the generally-broadcast message.

16. The mobile computing device of claim 15, wherein the processing unit is further configured to determine when the mobile computing device will exit the particular geographic region, and wherein the dissemination unit is further configured to disseminate the generally-broadcast message only when the mobile computing device will be within the particular geographic region for at least a predetermined duration.

17. The mobile computing device of claim 10, wherein the navigation module is further configured to determine an alternate route to the destination that does not traverse the particular geographic region, and
wherein the dissemination unit is further configured to display the alternate route.

18. The mobile computing device of claim 10, wherein the processing unit is further configured to determine when the mobile computing device will first intersect the particular geographic region, and wherein the dissemination unit is further configured to disseminate the generally-broadcast message before the mobile computing device intersects the particular geographic region.

19. The method of claim 1, wherein an amount of time between dissemination to the user and the mobile computing device intersecting the particular geographic region is configurable based on a priority of the generally-broadcast message.

20. The method of claim 1, wherein the mobile computing device does not traverse the particular geographic region while traveling along the explicitly planned future route to the destination.

21. The mobile computing device of claim 10, wherein the predetermined distance is based on the message type of the generally-broadcast message.

22. A tangible computer-readable device having instructions stored thereon that, when executed by at least one computing device, cause the at least one computing device to perform operations comprising:
determining an explicitly planned future route for the computing device based on a current location and a known destination;
receiving a generally-broadcast message, wherein the generally-broadcast message corresponds to a particular geographic region and a message type, and the generally-broadcast message includes a start date and time and an end date and time that define a period of time in which the generally-broadcast message will be of interest to a user;
determining a distance along the explicitly planned future route between the computing device and a closest border of the particular geographic region that intersects the explicitly planned future route;
determining a velocity at which the computing device will travel along the distance;
calculating a date and time of when the computing device traveling along the explicitly planned future route enters the particular geographic region based on the velocity and the distance;
determining the calculated date and time is within the start date and time and the end date and time of the generally-broadcast message corresponding to the particular geographic region; and processing the generally-broadcast message at the computing device only when the calculated date and time is within the start date and time and the end date and time of the generally-broadcast message to reduce computational processing at the computing device.

* * * * *